Dec. 20, 1927.
C. FORMAN
PATCH FOR PNEUMATIC TIRES
Filed June 7, 1926
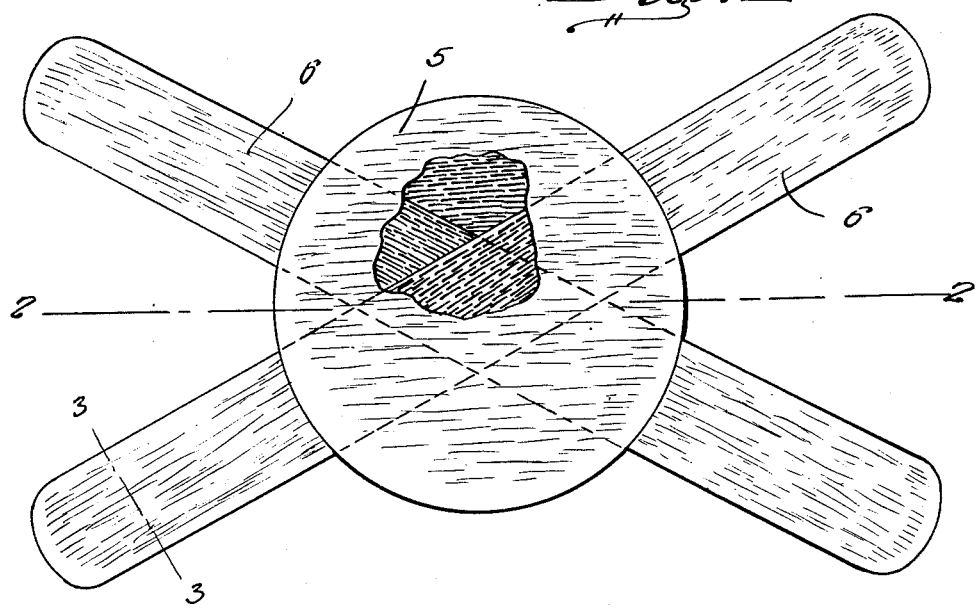
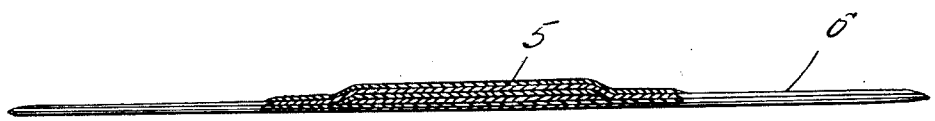
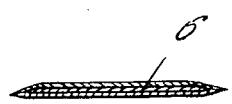
Inventor
Charles Forman,
By Clarence A O'Brien
Attorney Patented Dec. 20, 1927.

1,653,162

UNITED STATES PATENT OFFICE.

CHARLES FORMAN, OF TAFT, CALIFORNIA.

PATCH FOR PNEUMATIC TIRES.

Application filed June 7, 1926. Serial No. 114,256.

The present invention relates to repair patches for pneumatic tire casings and has particular relation to the type of patch adapted to be placed between the inner tube and the casing of such tires.

One of the important objects of the invention is to provide a repair patch for pneumatic tires of great durability because of the great thickness at the center thereof.

Another important object of the invention is to provide a tire patch of this nature which is simple in its construction, and which can be easily and economically manufactured.

Another object is to provide a patch of this nature which will readily conform to the size and contour of the interior of the casing, with which it is used.

A further object is to provide a patch which will adhere to and become an integral part of the casing, and which is constructed so that it may be used in a tire without injury to the inner tube.

A still further object of the invention is to provide a patch which may be constructed in one size and which is adapted to be used in tires of different sizes, so that one size patch may be manufactured that will fit all ordinary makes and sizes of the tires.

The above objects and others are accomplished by the novel construction, combination and arrangement of parts hereinafter specifically described, and illustrated in the accompanying drawings which form a part hereof, wherein is shown a preferred embodiment of the invention, but it is to be understood that numerous changes, variations, and modifications may be resorted to which come within the scope of the invention as hereinafter claimed.

In the drawing, in which like characters of reference are used to indicate corresponding parts of the several views:—

Figure 1 is a plan view of a patch constructed according to this invention,

Fig. 2 is a sectional view therethrough, taken on the line 2—2 of Fig. 1, and

Fig. 3 is a detail section taken substantially on the line 3—3 of Fig. 1.

Referring to the drawing in detail, it will be seen that the body of the patch is formed from two flexible disks 5 constructed of wire cord material and a pair of elongated strips 6 which cross each other in the shape of an X and extend between the disks 5. These wings or strips 6 are made in three laminations as is indicated to advantage in Fig. 3, and are constructed of cord material.

It will be seen, therefore, that at the center of the body 5 the patch is of a four ply structure because of the discs and the two wings or strips crossing each other.

Placing the wings in X shape, gives the four ply of cord in the center of the patch only which is placed over the injured part of the tire. The extending wings beyond the body give more gripping power and take the strain from the injured part of the tire. Placing the wings in X shape also distributes the stresses evenly to all parts of the patch and the shoe or casing. These wings allow the manufacture of a small, flexible, strong patch shoe which does away with the usual shoes that cause tires to pound when in use and wear the tire out on each end of the shoe and are also hard on the bearings on the automobile, and make the car hard to handle and difficult to hold the road.

The wings in the X shape allow the shoe to be placed in any part of the injured tire and also reinforce the shoe upon all angles and form a hinge for the body of the shoe. These wings prevent the tire from closing when the body of the shoe is placed over a hole of the tire casing. The edges of the shoe bound with rubber which prevents the end of the cord or fabric working and cutting the tube casing. The ends of the wings are rounded off which only lets one point of each wing at the same time come intact with the running surface, and also the same is true with the body of the shoe because it is round in formation.

Obviously this patch can be made flat and shaped to fit tires of all sizes. It is possible to use this patch shoe as a patch for road work by cleaning the inside of the casing in the region of the rupture with gasoline, peel off the glazed paper which will be furnished with the patch, and pressed firmly into position, then mount the casing on the rim and inflate the inner tube for surface. For vulcanizing, the tire should be bussed in the region of the rupture and given two coats of vulcanizing cement which is allowed to dry thoroughly. The cut of the tire is filled with tread stock and the center of the shoe is placed over the center of the cut as near as possible. Then the vulcanized stitcher is used and worked from the center of the shoe. The casing is then placed in the vulcanizer and cured for about an hour and a half.

It is thought that the construction, utility, and advantages of this invention will now be clearly understood by those skilled in this art without a more detailed description. It will be seen that I have provided an exceedingly efficient patch which will prove strong and durable, which is inexpensive to manufacture, which is thoroughly reliable and efficient in use, which is easy to place in the tire casing, and one which is otherwise well adapted to the purpose for which it is designed.

The present embodiment of the invention has been disclosed merely by way of example because in actual practice it has attained the features of advantage enumerated as desirable in the statement of the invention and the above description.

Having thus described my invention, what I claim as new is:—

1. A patch of the class described including a body formed from a pair of disks, and a pair of crossing strips passing between the disks and crossing each other at the centers of the disks.

2. A patch of the class described including a body formed from a pair of disks, and a pair of crossing strips passing between the disks and crossing each other at the centers of the disks, said strips being rounded at their ends.

3. A patch of the class described including a body formed from a pair of disks, and a pair of cross strips passing between the disks and crossing each other at the centers of the disks, said strips being rounded at their ends, said strips being formed in three laminations.

4. A patch of the class described including a body formed from a pair of disks, and a pair of crossing strips passing between the disks and crossing each other at the centers of the disks, said strips and said body being constructed of tire cord material.

In testimony whereof I affix my signature.

CHARLES FORMAN.